United States Patent
Ling et al.

(10) Patent No.: US 12,264,881 B2
(45) Date of Patent: Apr. 1, 2025

(54) MOBILE ENERGY STORAGE INTERNET SYSTEM

(71) Applicant: NANJING TECH UNIVERSITY, Jiangsu (CN)

(72) Inventors: Xiang Ling, Jiangsu (CN); Xiaolei Zhu, Jiangsu (CN); Qingsheng Li, Jiangsu (CN); Xin Huang, Jiangsu (CN); Hang Wang, Jiangsu (CN); Yu Lu, Jiangsu (CN); Mingsheng Du, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 268 days.

(21) Appl. No.: 18/024,848

(22) PCT Filed: Feb. 1, 2021

(86) PCT No.: PCT/CN2021/074608
§ 371 (c)(1),
(2) Date: Mar. 6, 2023

(87) PCT Pub. No.: WO2022/105061
PCT Pub. Date: May 27, 2022

(65) Prior Publication Data
US 2024/0027140 A1    Jan. 25, 2024

(30) Foreign Application Priority Data
Nov. 17, 2020  (CN) ......................... 202011286498.4

(51) Int. Cl.
*F28D 20/00*  (2006.01)
*F28D 20/02*  (2006.01)
(Continued)

(52) U.S. Cl.
CPC ........... *F28D 20/00* (2013.01); *F28D 20/021* (2013.01); *F28D 21/001* (2013.01); *H02J 15/00* (2013.01); *F28D 2020/0026* (2013.01)

(58) Field of Classification Search
CPC ...... F28D 20/00; F28D 20/021; F28D 21/001; F28D 2020/0026; H02J 15/00
(Continued)

(56) References Cited

U.S. PATENT DOCUMENTS 9,605,659 B2 * 3/2017 Haar ................... E04B 1/34336
9,812,865 B2 * 11/2017 Treppmann ............... H02J 3/30
(Continued)

FOREIGN PATENT DOCUMENTS

CN  206623727 U  * 11/2017
CN  109870057 A    6/2019
(Continued)

*Primary Examiner* — Jon T. Schermerhorn, Jr.
(74) *Attorney, Agent, or Firm* — MUNCY, GEISSLER, OLDS & LOWE, P. C.

(57) ABSTRACT

The present invention discloses a mobile energy storage internet system. The mobile energy storage internet system comprises distributed energy harvesting devices, mobile cold storage/heat storage devices, an energy system dispatching and monitoring center, and cold supply/heat supply terminals. The distributed energy harvesting devices are used for harvesting industrial waste cold energy/heat energy. The energy system dispatching and monitoring center is used for monitoring the residual energy of the distributed energy harvesting devices and the energy demand of the cold supply/heat supply terminals respectively, and mobilizing the mobile cold storage/heat storage devices to the distributed energy harvesting devices to store residual energy or to the cold supply/heat supply terminals to release the stored residual energy. The mobile energy storage internet system disclosed by the present invention can make full use of various waste industrial residual energy, and nest electricity
(Continued)

of renewable energy power stations and nuclear power stations, realizes long-distance cold supply and heat supply without pipe network, and reduces energy consumption in construction industries.

9 Claims, 2 Drawing Sheets

(51) Int. Cl.
 *F28D 21/00* (2006.01)
 *H02J 15/00* (2006.01)

(58) Field of Classification Search
 USPC .......................................................... 165/200
 See application file for complete search history.

(56) References Cited

U.S. PATENT DOCUMENTS

| | | | | |
|---|---|---|---|---|
| 2021/0273454 A1* | 9/2021 | Dannar | ................... | B60L 58/10 |
| 2024/0128761 A1* | 4/2024 | Bellows | ................... | H02J 3/322 |
| 2024/0313541 A1* | 9/2024 | Bellows | ................... | H02J 3/322 |

FOREIGN PATENT DOCUMENTS

| | | | | |
|---|---|---|---|---|
| CN | 109870058 A | | 6/2019 | |
| CN | 109870980 A | | 6/2019 | |
| CN | 216521944 U | * | 5/2022 | |

\* cited by examiner

MOBILE ENERGY STORAGE INTERNET SYSTEM

TECHNICAL FIELD

The present invention particularly relates to a mobile energy storage internet system.

BACKGROUND

China's energy consumption ranks first in the world and accounts for about 20% of the world's energy consumption, but the energy utilization rate is relatively low. The energy consumption per unit GDP is about 2.2 times that of the United States, 2.7 times that of Japan, 2.9 times that of Germany, and 4 times that of the United Kingdom. There is a big gap between the energy utilization level of China and the energy utilization level of developed countries, and therefore, energy-conservation priority has become one of the major strategies for China's long-term development.

Process industries are high energy consumption industries, and account for about ⅓ of China's total energy consumption, but the energy utilization rate of the process industries is only about 60%, and therefore the process industries have great energy-saving potential. If the energy utilization rate can be increased by 2.5%, the electricity saved is equivalent to the electricity generated by the Three Gorges Dam in one year. In the process industries, the utilization rate of medium and high-temperature waste heat is relatively high, but the low-temperature waste heat below 250° C. and some waste cold energy cannot be effectively utilized due to the relatively low energy grade. However, the construction industries just need a large amount of low-grade energy for heating and cooling, wherein the temperature of a heating medium for heating is 60° C. and the temperature of chilled water for cooling is 7° C. Moreover, the energy consumption of the construction industries is huge and accounts for about 30% of China's total energy consumption, but the overall energy-saving standard-reaching rate is less than 10%. The process industries in China have a total annual residual energy emission of about 740 million tons of standard coal, while heating ventilation, and air conditioning in the construction industries have a total annual energy consumption of about 700 million tons. If a large amount of low-grade residual energy in the process industries can be used for heating and cooling in the construction industries, the energy consumption in the construction industries can be significantly reduced, which has great energy-saving significance and social benefits.

In order to realize the above concept, the bridge between low-grade heat sources in process industries and building energy consumption should be built, and energy storage and transportation technologies are the key technologies of low-grade energy utilization.

However, the existing conventional low-grade residual energy is generally recycled through pipeline transportation. Pipeline recycling methods have many disadvantages such as high investment cost, serious energy loss, and limited distance. The residual energy can only be recycled in a small range, and cannot be fully utilized, and the recycling rate is relatively low. In order to avoid the impact on power grids, there are still a large number of electricity wasting phenomena in the growing various types of renewable energy power stations, such as waste wind in wind power stations, waste light in photovoltaic stations, waste water in small hydropower stations, and nest electricity in nuclear power stations. This part of energy cannot be effectively utilized, resulting in huge energy waste.

SUMMARY OF THE INVENTION

The present invention is aimed at providing a mobile energy storage internet system, which can make full use of various industrial waste residual energy, and nest electricity in renewable energy power stations and nuclear power stations, realizes long-distance cold supply/heat supply without a pipe network, and reduces the energy consumption of construction industries.

The technical scheme of the present invention is as follows:

the present invention provides the mobile energy storage internet system, which includes distributed energy harvesting devices, mobile cold storage/heat storage devices, an energy system dispatching and monitoring center, and cold supply/heat supply terminals. The distributed energy harvesting devices are used for harvesting industrial waste cold energy/heat energy. The energy system dispatching and monitoring center is used for monitoring the residual energy of the distributed energy harvesting devices and the energy demand of the cold supply/heat supply terminals respectively, and mobilizing the mobile cold storage/heat storage devices to the distributed energy harvesting devices to store the residual energy or to the cold supply/heat supply terminals to release the stored residual energy.

Detection devices and the distributed energy harvesting devices are arranged in different types of factories with a large number of low-grade residual energy yield and various types of renewable energy power stations or nuclear power plants. The distributed energy harvesting devices are arranged in petrochemical, metallurgy, and building material factories, and are used for harvesting industrial waste heat. The distributed energy harvesting devices are arranged in air separation, LNG (Liquefied Natural Gas) and other factories, and are used for harvesting waste cold energy.

The distributed energy harvesting devices are arranged in renewable energy power stations such as wind power stations, photoelectric stations, and small hydropower stations or nuclear power stations, utilize waste wind in the wind power stations, waste light in the photoelectric stations, waste water in the small hydropower stations and the nest electricity in the nuclear power stations to perform cooling or heating according to practical requirements, and harvest generated cold energy or heat energy. The distributed energy harvesting devices adopt a heat exchanger structure to realize the harvesting of cold energy/heat energy.

Further, the energy system dispatching and monitoring center is used for receiving and storing the residual energy type and yield of each residual energy harvesting place, selecting the corresponding types of mobile cold storage/heat storage devices according to the types of residual energy in different residual energy harvesting places and allocating a corresponding number of mobile cold storage/heat storage devices to the corresponding harvesting places according to the actual operation state of each residual energy harvesting place to store the harvested waste cold energy/heat energy.

Further, the energy-charged mobile cold storage/heat storage devices return to the energy system dispatching and monitoring center for standby; according to the heat supply or cold supply load demand of the cold supply/heat supply terminals, the energy system dispatching and monitoring center is used for selecting the mobile cold storage/heat storage devices that meet the requirements, and comprehensively considering the time, distance, energy type, and load capacity to plan the optimal path of the mobile cold storage/heat storage devices. The screened mobile cold storage/heat storage devices go to the locations of the cold supply/heat supply terminals according to the planning path. The release and utilization of the stored cold energy/heat energy are realized through a heat exchange device.

Further, after releasing energy at the cold supply/heat supply terminals, the mobile cold storage/heat storage devices return to the energy system dispatching and monitoring center for standby; under the dispatching by the energy system dispatching and monitoring center, the mobile cold storage/heat storage devices go back to the residual energy harvesting places to store residual energy; and the above process is repeated to realize dynamic circulation.

The mobile energy storage internet system can also utilize the peak-valley electricity mechanism, utilizes refrigerators or heaters to convert the valley electricity into cold energy or heat energy for storage in the valley electricity period, and releases the stored cold energy or heat energy in the peak electricity period, and thus, the production operation cost is reduced.

The mobile cold storage/heat storage device adopts a box structure or a tank structure and is filled with phase change energy storage materials. The box structure and the tank structure both include an external safety box or tank, internal heat exchange plate arrays/tube bundles, a flow pipeline, a monitoring system, and an electronic control system. The safety box/tank needs to be fixedly arranged on a mobile carrier to realize the flexible movement of the mobile cold storage/heat storage device. The heat exchange plate arrays/tube bundles are equipment for heat exchange between the phase change materials and a heat exchange working medium and are fixed in the safety box/tank. The phase change materials are placed between the safety box/tank and the heat exchange plate arrays or encapsulated in the heat exchange plate arrays. The flow pipeline restricts the flow path of the working medium (heat exchange working medium), and an interface is reserved outside the safety box/tank. The monitoring system is used for measuring and displaying the pressure, temperature and other data of all parts of the mobile cold storage/heat storage device on a display screen, and feeding the pressure, temperature and other data back to the electronic control system for controlling the working conditions of all valves.

Further, the mobile cold storage/heat storage device can be filled with four different types of phase change materials to meet the temperature requirements of different application occasions; when being used for indoor heat supply or hot water supply, the mobile cold storage/heat storage device is filled with modified sodium acetate trihydrate, paraffin or hexadecanoic acid phase change materials; when being used for indoor cold supply or drying dehumidification, the mobile cold storage/heat storage device is filled with tetradecane or pentadecane phase change materials; when being used for cold storage refrigeration, the mobile cold storage/heat storage device is filled with composite phase change materials such as a glycerol/sodium chloride mixed aqueous solution or an ammonium chloride/acrylic acid mixture; and when being used for steam supply, the mobile cold storage/heat storage device is filled with phase change materials such as high-density polyethylene or erythritol.

The cold supply/heat supply terminals are the final consumption objects of the harvested residual energy. The cold supply/heat supply terminals can be divided into four types according to the cold energy/heat energy temperature requirements: cold storage refrigeration, indoor cooling or drying dehumidification, indoor heat supply or hot water supply, and steam supply. The mobile cold storage/heat storage devices filled with the phase change materials such as the modified sodium acetate trihydrate can be used for heat supply or hot water supply in occasions such as residential areas, hospitals, and office buildings. The mobile cold storage/heat storage devices filled with phase change materials such as tetradecane can be used for indoor cold supply or drying dehumidification in occasions such as residential areas, hospitals, and office buildings. The mobile cold storage/heat storage devices filled with a glycerin and sodium chloride mixed aqueous solution can be used for cold storage refrigeration. The mobile cold storage/heat storage devices filled with phase change materials such as high-density polyethylene can be used for steam supply in occasions such as canteens, hotels, and bathhouses. The dispatching area of the mobile energy storage internet system is within the range of 150 km.

The mobile energy storage internet system can make full use of various waste industrial residual energy, and nest electricity of renewable energy power stations and nuclear power stations, realizes long-distance cold supply and heat supply without a pipe network, and reduces the energy consumption of construction industries.

among which, 1—distributed energy harvesting device, 2—mobile cold storage/heat storage device, 3—dispatching and monitoring center, 4—cold supply/heat supply terminal, 5—safety box, 6—heat exchange plate array, 7—flow pipeline, 8—monitoring device, and 9—electronic control system.

DETAILED DESCRIPTION OF THE INVENTION

In order to deepen the understanding of the present invention, the present invention will be further described below in conjunction with embodiments and drawings in detail, and the embodiments are part of the embodiments of the invention, not all of the embodiments.

Figure 1:
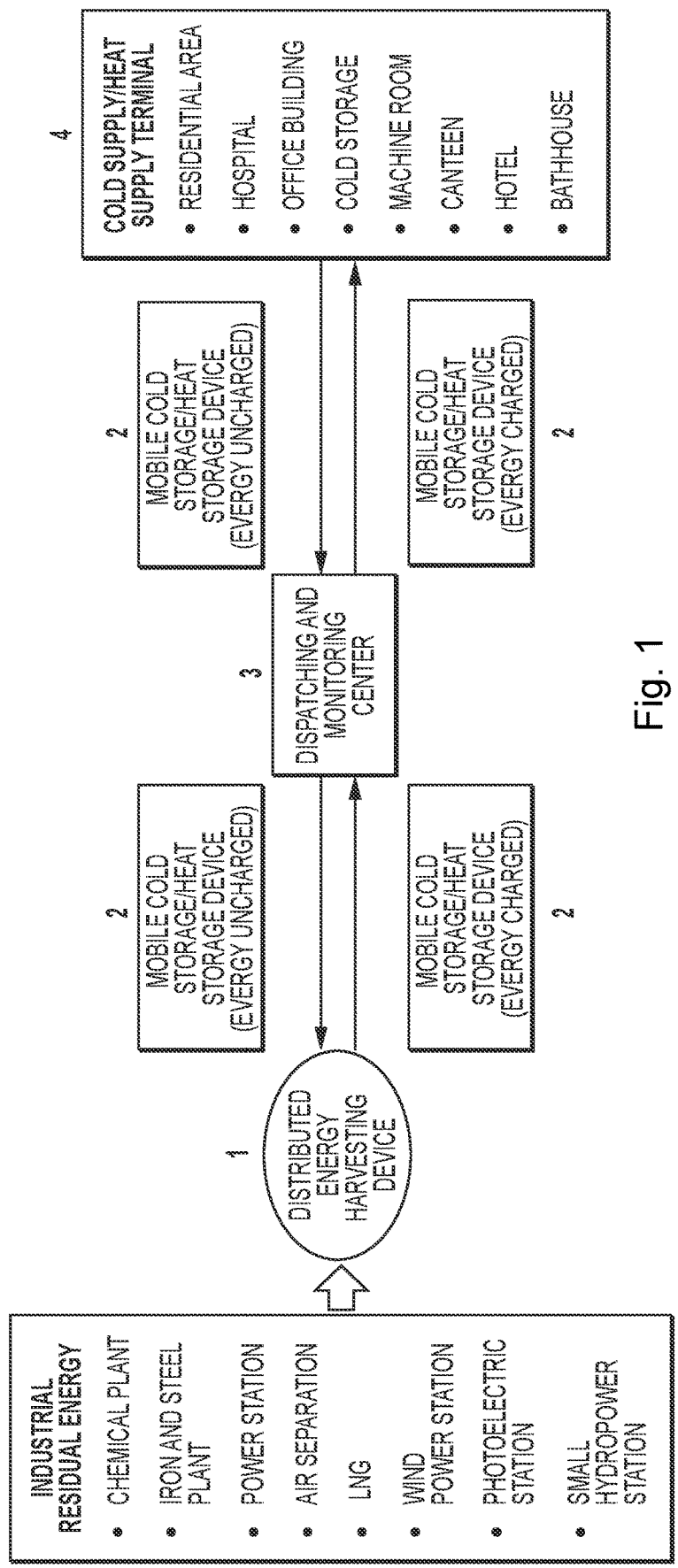
FIG. 1 is a diagram of a mobile energy storage internet system provided by the present invention.
Figure 2:
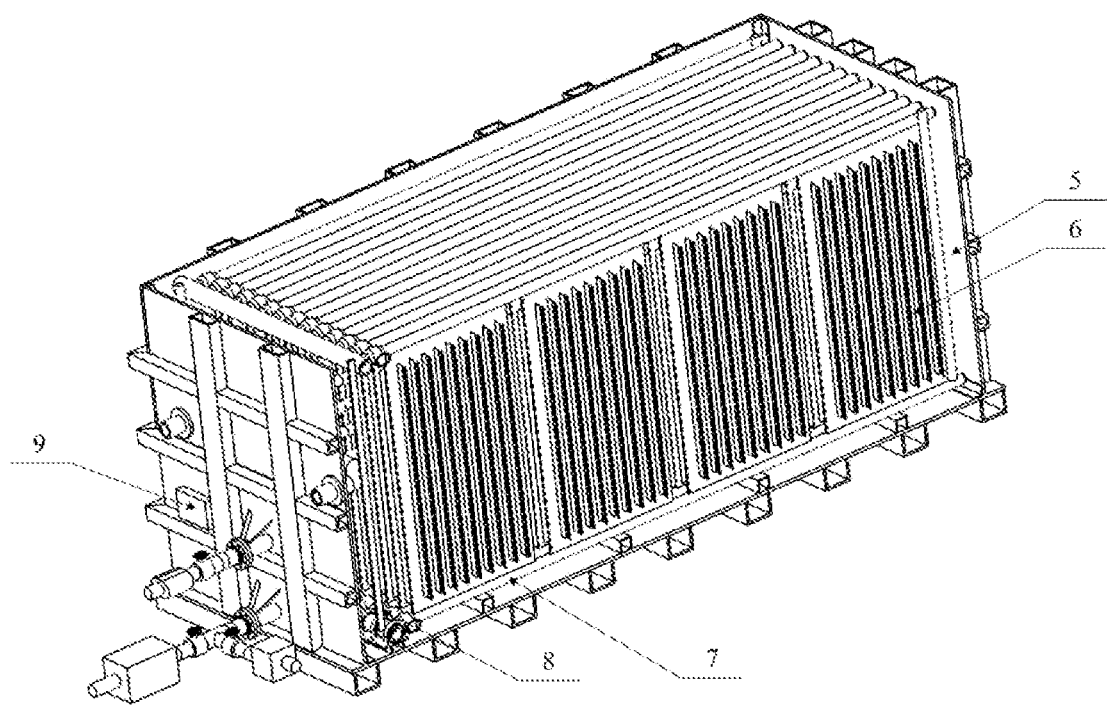
FIG. 2 is a sectional view of a mobile cold storage/heat storage device provided by the present invention.

Referring to FIG. 1 to FIG. 2, the mobile energy storage internet system includes distributed energy harvesting devices 1, mobile cold storage/heat storage devices 2, an energy system dispatching and monitoring center 3, and cold supply/heat supply terminals 4. Residual energy and various types of consumption terminals are interconnected through the mobile energy storage internet system to achieve high-efficiency, fast and low-cost utilization of residual energy. The distributed energy harvesting devices 1 are arranged at a plurality of different residual energy harvesting places to harvest industrial waste cold energy/heat energy. The energy system dispatching and monitoring center 3 is used for monitoring the residual energy type and yield of each residual energy harvesting place, and allocating different types of mobile cold storage/heat storage devices 2 as needed to the corresponding harvesting places to store the harvested waste cold energy/heat energy; the energy-charged mobile cold storage/heat storage devices 2 return to the energy system dispatching and monitoring center 3; according to the cold supply/heat supply load demand of the cold supply/heat supply terminals 4, the energy system dispatching and monitoring center 3 is used for screening and transporting the mobile cold storage/heat storage devices 2 that meet the requirements to the locations of the cold supply/heat supply terminals 4; the cold supply/heat supply terminals 4 are used for obtaining the required energy from the mobile cold storage/heat storage devices 2; the energy-released mobile cold storage/heat storage devices 2 go back to the residual energy harvesting places to harvest and store the residual energy; and the above process is repeated to realize dynamic circulation.

The distributed energy harvesting devices 1 adopt the structure of a heat exchanger, are respectively arranged in different types of plants, and are used for harvesting different types of industrial residual energy. The distributed energy harvesting devices 1 are arranged in petrochemical, metallurgy, building material and other factories, and exchange heat with low-grade heat sources such as flue gas through circulating water serving as an intermediate heat exchange medium or heat conduction oil, and the heat exchange medium absorbs low-grade waste heat in flue gas; or the distributed energy harvesting devices 1 are arranged in air separation, LNG (Liquefied Natural Gas) and other factories, and exchange heat with liquefied air and liquefied natural gas through a refrigerant serving as an intermediate heat exchange medium, and the heat exchange medium absorbs low-grade cold energy; or the distributed energy harvesting devices 1 are arranged in wind power stations, photoelectric stations, small hydropower stations and nuclear power stations, and utilize refrigerators or heaters to convert waste wind in the wind power stations, waste light in the photoelectric stations, waste water in the small hydropower stations and nest electricity in the nuclear power stations into cold energy or heat energy as required, and then harvest generated cold energy or heat energy.

The system dispatching and monitoring center 3 is used for monitoring the harvesting places where the distributed energy harvesting devices 1 are located, and receiving and storing the residual energy type and yield of each residual energy harvesting place. According to the actual operation state of each residual energy harvesting place, the system dispatching and monitoring center 3 performs analytical calculations to determine the types and quantity of the mobile cold storage/heat storage devices 2 required by different harvesting places and allocates the corresponding mobile cold storage/heat storage devices 2 to the corresponding harvesting places to store the harvested waste cold energy/heat energy.

The mobile cold storage/heat storage device 2 adopts a box structure or a tank structure. As shown in FIG. 2, the box structure is filled with a phase change energy storage material. The box structure includes an external safety box 5, internal heat exchange plate arrays 6, a flow pipeline 7, a monitoring system 8, and an electronic control system 9. The safety box 5 is of a frame structure.

The internal heat exchange plate arrays 6, the flow pipeline 7, the monitoring system 8 and the electronic control system 9 are arranged on the safety box 5. The safety box 5 needs to be fixedly arranged on a mobile carrier to realize the flexible movement of the mobile cold storage/heat storage device 2. The heat exchange plate arrays 6 are equipment for heat exchange between the phase change material and a use working medium (heat exchange working medium, such as water, heat conduction oil or refrigerant), and are fixed in the safety box 5/tank; the phase change material is placed between the safety box 5/tank and the heat exchange plate array 6 or encapsulated in the heat exchange plate arrays 6; the flow pipeline 7 restricts the flow path of the required working medium (heat exchange working medium), and an interface is reserved outside the safety box 5/tank; the monitoring system 8 is used for measuring and displaying the pressure, temperature and other data of all parts of the mobile cold storage/heat storage device 2 on a display screen, and feeding the pressure, temperature and other data back to the electronic control system 9 for controlling the working conditions of all valves.

The specific structure of the mobile cold storage/heat storage device 2 can also refer to a patent entitled a mobile phase change heat storage and cold storage device with the patent number of ZL202010013869.5.

Specifically, the mobile cold storage/heat storage device 2 adopts a mobile container or tank, is usually arranged on a truck and transported by the truck, and thus, long-distance cold supply/heat supply without a pipe network is realized.

The mobile cold storage/heat storage devices 2 can be divided into four types according to the difference of filled phase change materials: (1) the mobile cold storage/heat storage device 2 is filled with modified sodium acetate trihydrate, paraffin, hexadecanoic acid and other phase change materials and used for indoor heat supply or hot water supply; (2) the mobile cold storage/heat storage device 2 is filled with tetradecane, pentadecane and other phase change materials and used for indoor cold supply or drying dehumidification; (3) the mobile cold storage/heat storage device 2 is filled with a glycerin/sodium chloride mixed aqueous solution, an ammonium chloride/acrylic acid mixture and other phase change materials and used for cold storage refrigeration; and (4) the mobile cold storage/heat storage device 2 is filled with high-density polyethylene, erythritol and other phase change materials and used for steam supply.

The mobile cold storage/heat storage devices 2 filled with the tetradecane phase change material go to air separation and LNG liquefaction plants, and exchange heat with the refrigerant in the temperature range of minus 30° C. to 0° C. to absorb and store cold energy; the mobile cold storage/heat storage devices 2 filled with the glycerin and sodium chloride mixed aqueous solution go to the air separation and LNG liquefaction plants, and exchange heat with the refrigerant below minus 30° C. to absorb and store the cryogenic cold energy of the refrigerant; the mobile cold storage/heat storage devices 2 filled with the modified sodium acetate trihydrate phase change materials go to chemical plants, steel mills and power stations, and exchange heat with circulating water to absorb and store heat energy; the mobile cold storage/heat storage devices 2 filled with the high-density polyethylene phase change material go to chemical plants, steel mills and power stations, and exchange heat with heat conduction oil to absorb and store heat. After energy storage is completed, the mobile cold storage/heat storage devices 2 return to the energy system dispatching and monitoring center 3, and wait for being further allocated by the dispatching and monitoring center 3.

The main objects of the cold supply/heat supply terminals 4 include residential areas, hospitals, office buildings, cold storages, computer rooms, canteens, hotels, bathhouses, and other places.

According to the requirements, cold energy/cold energy temperature requirements of each terminal are divided into four types: indoor heat supply and hot water supply, indoor cold supply, cold storage refrigeration, and steam supply. The energy dispatching and monitoring center 3 is used for receiving the heat supply or cold supply type requirements and the corresponding load capacity of each cold supply/heat supply terminal 4, selecting the mobile cold storage/heat storage devices 2 that meet the requirements, and comprehensively considering the time, distance, energy type, and load capacity to plan the optimal path of the mobile cold storage/heat storage device 2.

The energy dispatching and monitoring center 3 is used for allocating the mobile cold storage/heat storage devices 2 filled with the tetradecane phase change materials to residential areas, hospitals, and office buildings to meet the local cold supply demand. The energy dispatching and monitoring center 3 is used for allocating the mobile cold storage/heat storage devices 2 filled with the glycerin and sodium chloride mixed aqueous solution to cold storages to reduce the refrigeration consumption of the cold storages. The energy dispatching and monitoring center 3 is used for allocating the mobile cold storage/heat storage devices 2 filled with the modified sodium acetate trihydrate phase change material to residential areas, hospitals, and office buildings to meet the local heat supply and hot water supply demand. The energy dispatching and monitoring center 3 is used for allocating the mobile cold storage/heat storage devices 2 filled with the high-density polyethylene phase change materials to canteens, hotels, and bathhouses to meet the local steam supply demand. After the energy release is completed, the mobile cold storage/heat storage devices 2 return to the energy dispatching and monitoring center 3 for standby, and under the dispatching and distribution by the energy dispatching and monitoring center 3, the mobile cold storage/heat storage devices 2 go back to the corresponding residual energy harvesting places to harvest residual energy. The above process is repeated to realize dynamic circulation.

The mobile energy storage internet system of the present embodiment can utilize the peak-valley electricity mechanism, adopts refrigerators or heater in the valley electricity period t to convert the valley electricity into cold energy or heat energy for storage, and releases and utilizes the cold energy or heat energy in the peak electricity period. In the valley electricity period, refrigerators or heaters are used for converting the valley electricity into cold energy or heat energy. The converted cold energy or heat energy is harvested by the distributed energy harvesting device 1 and is stored in the mobile cold storage/heat storage devices 2; and in the peak electricity period, the energy-charged mobile cold storage/heat storage devices 2 go to the cold supply/heat supply terminals 4 to release the stored cold energy or heat energy.

The dispatching area of the mobile energy storage internet system of the embodiment is within the range of 150 km.

The invention claimed is:

1. A mobile energy storage internet system, characterized by comprising distributed energy harvesting devices, mobile cold storage/heat storage devices, an energy system dispatching and monitoring center, and cold supply/heat supply terminals, wherein the distributed energy harvesting devices are used for harvesting industrial waste cold energy/heat energy, and the energy system dispatching and monitoring center is used for monitoring the residual energy of the distributed energy harvesting devices and the energy demand of the cold supply/heat supply terminals respectively, and mobilizing the mobile cold storage/heat storage devices to the distributed energy harvesting devices to store residual energy or to the cold supply/heat supply terminals to release stored residual energy.

2. The mobile energy storage internet system of claim 1, wherein the distributed energy harvesting devices are arranged at a plurality of different residual energy harvesting places to harvest industrial waste cold energy/heat energy; the energy system dispatching and monitoring center is used for monitoring the residual energy type and yield of each residual energy harvesting place, and allocating different types of mobile cold storage/heat storage devices as needed to the corresponding harvesting places to store harvested waste cold energy/heat energy; the energy-charged mobile cold storage/heat storage devices return to the energy system dispatching and monitoring center; according to the cold supply/heat supply load demand of the cold supply/heat supply terminals, the energy system dispatching and monitoring center is used for screening and transporting the mobile cold storage/heat storage devices that meet the requirements to the locations of the cold supply/heat supply terminals; the cold supply/heat supply terminals are used for obtaining the required energy from the mobile cold storage/heat storage devices; the energy-released mobile cold storage/heat storage devices go back to the residual energy harvesting places to harvest and store the residual energy; and the above process is repeated to realize dynamic circulation.

3. The mobile energy storage internet system of claim 1, characterized, wherein the mobile energy storage internet system can utilize the peak-valley electricity mechanism, adopts refrigerators or heaters to convert valley electricity into cold energy or heat energy for storage in the valley electricity period, and releases and utilizes cold energy or heat energy in the peak electricity period.

4. The mobile energy storage internet system of claim 1, wherein the distributed energy harvesting devices are distributed at a plurality of independent residual energy supply places, and are responsible for harvesting the waste cold energy/heat energy of each supply place, and storing the harvested energy in the mobile cold/heat storage devices; the distributed energy harvesting devices adopt a heat exchanger structure to realize the harvesting of cold energy/heat energy; and the distributed energy harvesting devices can be arranged in petrochemical, metallurgical and building material factories and are used for harvesting the industrial waste heat; the distributed energy harvesting devices are arranged in air separation and liquefied natural gas plants and are used for harvesting the waste cold energy; and the distributed energy harvesting devices can be arranged in renewable energy power stations or nuclear power stations, and utilize waste wind in wind power stations, waste light in photovoltaic stations, waste water in small hydropower stations or nest electricity in nuclear power stations to realize cooling or heating and harvest the generated cold energy/heat energy.

5. The mobile energy storage internet system of claim 1, wherein the mobile cold storage/heat storage device adopts a box structure or a tank structure; the box structure and the tank structure both comprise an external safety box or tank, internal heat exchange plate arrays/tube bundles, a flow pipeline, a monitoring system and an electronic control system, wherein the safety box/tank needs to be fixedly arranged on a mobile carrier to realize the flexible movement of the mobile cold storage/heat storage device; the heat exchange plate arrays/tube bundles are equipment for heat exchange between a phase change material and a heat exchange working medium, and are fixed in the safety box/tank; the phase change material is placed between the safety box/tank and the heat exchange plate arrays/tube bundles or encapsulated in the heat exchange plate arrays/ tube bundles; the flow pipeline restricts the flow path of the heat exchange working medium, and an interface is reserved outside the safety box/tank; and the monitoring system is used for measuring and displaying the pressure, flow rate and temperature data of all parts of the mobile cold storage/heat storage device on a display screen, and feeding the pressure, flow rate and temperature data back to the electronic control system for controlling the working conditions of all valves.

6. The mobile energy storage internet system of claim 5, wherein the mobile cold storage/heat storage device can be filled with four different types of phase change materials to meet the temperature requirements of different application occasions; the mobile cold storage/heat storage device can be filled with modified sodium acetate trihydrate, paraffin or hexadecanoic acid phase change materials for indoor heat supply or hot water supply; the mobile cold storage/heat storage device can be filled with tetradecane or pentadecane phase change materials for indoor cold supply or drying dehumidification; the mobile cold storage/heat storage device can be filled with glycerol/sodium chloride mixed aqueous solution phase change materials or ammonium chloride/acrylic acid mixture phase change materials for cold storage refrigeration; and the mobile cold storage/heat storage device can be filled with high density polyethylene or erythritol phase change materials for steam supply.

7. The mobile energy storage internet system of claim 1, wherein the energy system dispatching and monitoring center is used for receiving and storing the residual energy types and yields of all residual energy harvesting places and the cold energy/heat energy load required by each cold supply/heat supply terminal, reasonably allocating the mobile cold storage/heat storage devices according to the residual energy types and yields and the load required by each cold supply/heat supply terminal, and comprehensively considering time, distance, energy types and load size to plan the optimal path of the mobile cold storage/heat storage devices.

8. The mobile energy storage internet system of claim 1, wherein the cold supply/heat supply terminals are final consumption objects of the harvested residual energy, and objects of the cold supply/heat supply terminals include residential areas, hospitals, office buildings, cold storages, computer rooms, canteens, hotels or bathhouses; and the cold supply/heat supply terminals are divided into four types according to the cold energy/heat energy temperature requirements: indoor heat supply/hot water supply, cold storage refrigeration, indoor cold supply or drying dehumidification, or steam supply.

9. The mobile energy storage internet system of claim 1, wherein the dispatching area of the mobile energy storage internet system is within the range of 150 km.

* * * * *